United States Patent
Hyser et al.

(10) Patent No.: US 8,732,699 B1
(45) Date of Patent: May 20, 2014

(54) MIGRATING VIRTUAL MACHINES BETWEEN PHYSICAL MACHINES IN A DEFINE GROUP

(75) Inventors: Chris D. Hyser, Victor, NY (US); Bret A. McKee, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2107 days.

(21) Appl. No.: 11/588,607

(22) Filed: Oct. 27, 2006

(51) Int. Cl.
*G06F 9/455* (2006.01)

(52) U.S. Cl.
USPC .......................................................... 718/1

(58) Field of Classification Search
None
See application file for complete search history.

(56) References Cited

U.S. PATENT DOCUMENTS

| | | | |
|---|---|---|---|
| 5,745,735 A | 4/1998 | Cohn | |
| 5,802,062 A | 9/1998 | Gehani | |
| 6,321,337 B1 | 11/2001 | Reshef | |
| 6,421,739 B1 | 7/2002 | Holiday | |
| 6,732,139 B1 | 5/2004 | Dillenberger | |
| 6,901,522 B2 | 5/2005 | Buch | |
| 6,934,952 B2 | 8/2005 | Sarkar | |
| 6,944,699 B1 | 9/2005 | Bugnion et al. | |
| 6,970,902 B1 | 11/2005 | Moon | |
| 6,985,951 B2 | 1/2006 | Kubala | |
| 7,089,558 B2 | 8/2006 | Baskey | |
| 7,127,625 B2 | 10/2006 | Farkas | |
| 7,174,381 B2 | 2/2007 | Gulko | |
| 7,203,944 B1 * | 4/2007 | van Rietschote et al. | 718/104 |
| 7,480,908 B1 | 1/2009 | Tene | |
| 7,519,964 B1 * | 4/2009 | Islam et al. | 717/177 |
| 2001/0034752 A1 * | 10/2001 | Kremien | 709/105 |
| 2002/0194389 A1 | 12/2002 | Worley, Jr. et al. | |
| 2004/0010787 A1 | 1/2004 | Traut | |
| 2004/0117539 A1 | 6/2004 | Bennett | |
| 2004/0186920 A1 | 9/2004 | Birdwell | |
| 2004/0193476 A1 | 9/2004 | Aerdts | |
| 2005/0039180 A1 | 2/2005 | Fultheim | |
| 2005/0060590 A1 | 3/2005 | Bradley | |
| 2005/0149940 A1 | 7/2005 | Calinescu | |
| 2005/0166074 A1 | 7/2005 | Hack | |
| 2005/0166075 A1 | 7/2005 | Hack | |
| 2005/0246505 A1 | 11/2005 | McKenney et al. | |
| 2005/0251802 A1 | 11/2005 | Bozek | |
| 2005/0278722 A1 | 12/2005 | Armstrong et al. | |
| 2006/0023884 A1 | 2/2006 | McKee | |
| 2006/0041733 A1 | 2/2006 | Hyser | |
| 2006/0075067 A1 | 4/2006 | Blackmore | |
| 2006/0136913 A1 | 6/2006 | Sameske | |
| 2006/0149906 A1 | 7/2006 | Misra | |
| 2006/0195715 A1 | 8/2006 | Herington | |
| 2006/0200819 A1 | 9/2006 | Cherkasova et al. | |

(Continued)

OTHER PUBLICATIONS

MVware Technology Network, "VMware VirtualCenter 1.2 Support Documentation," http://www.vmware.com/support/vc12/doc/c13migrationover.html, 16 pages (at least as early as Oct. 25, 2006).

(Continued)

*Primary Examiner* — Gregory A Kessler (57) ABSTRACT

In a system including plural physical machines containing virtual machines, a first group including a subset, of the plural physical machines is defined. A controller is provided in the first group for identifying a placement of virtual machines on the physical machines in the first group. Migration is performed of at least one of the virtual machines between or among the physical machines in the first group according to the identified placement.

20 Claims, 3 Drawing Sheets

(56) References Cited

U.S. PATENT DOCUMENTS

| | | |
|---|---|---|
| 2006/0200820 A1 | 9/2006 | Cherkasova et al. |
| 2006/0200821 A1 | 9/2006 | Cherkasova et al. |
| 2006/0230407 A1 | 10/2006 | Rosu |
| 2007/0043860 A1 | 2/2007 | Pabari |
| 2007/0067435 A1 | 3/2007 | Landis |
| 2007/0079307 A1 | 4/2007 | Dhawan |
| 2007/0083642 A1 | 4/2007 | Diedrich |
| 2007/0124474 A1 | 5/2007 | Margulis |
| 2007/0171921 A1 | 7/2007 | Wookey |
| 2007/0180280 A1 | 8/2007 | Bolan |
| 2007/0180448 A1 | 8/2007 | Low |
| 2007/0180450 A1 | 8/2007 | Croft |
| 2007/0186212 A1 | 8/2007 | Mazzaferri |

OTHER PUBLICATIONS

Wikipedia definition of "Virtual machine," http://en.wikipedia.org/wiki/Virtual_machine, pp. 1-6 (at least as early as Sep. 6, 2006).

TheFreeDictionary definition of "Virtual Machine," http://computing-dictionary.thefreedictionary.com/virtual%20machine, pp. 1-3 (at least as early as Sep. 6, 2006).

Wikipedia definition for "Hypervisor," http://en.wikipedia.org/wiki/Hypervisor, pp. 1-2 (at least as early as Sep. 6, 2006).

Megow et al., "Stochastic Online Scheduling on Parallel Machines," Springer-Verlag Berlin Heidelberg, pp. 167-180, 2005.

Hou et al., "A Genetic Algorithm for Multiprocessor Scheduling," IEEE Transactions on Parallel and Distributed Systems, vol. 5, No. 2, Feb. 1994.

YarKhan et al., "Experiments with Scheduling Using Simulated Annealing in a Grid Environment," Springer-Verlag Berlin Heidelberg, pp. 232-242, 2002.

U.S. Appl. No. 11/588,683, Non-Final Rejection dated Jun. 11, 2009, pp. 1-14 and attachments.

U.S. Appl. No. 11/588,683, Final Rejection dated Nov. 25, 2009, pp. 1-19 and attachments.

U.S. Appl. No. 11/588,683, Non-Final Rejection dated Jul. 13, 2010, pp. 1-20 and attachments.

U.S. Appl. No. 11/588,691, Non-Final Rejection dated Oct. 14, 2010, pp. 1-15 and attachments.

U.S. Appl. No. 11/588,691, Final Rejection dated Mar. 31, 2011, pp. 1-18 and attachments.

\* cited by examiner

MIGRATING VIRTUAL MACHINES BETWEEN PHYSICAL MACHINES IN A DEFINE GROUP

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system of a virtual machine can be different from the host operating system (if any exists) that may be running on the computer on which the virtual machine is deployed.

In addition, a greater level of isolation is provided between or among applications running in different virtual machines. In some cases, virtual machines also allow multiple applications to more efficiently share common resources (processing resources, input/output or I/O resources, and storage resources) of the computer, For enhanced performance, virtual machines can be provided on multiple computers that are interconnected by a network. When deploying virtual machines on multiple computers, a human administrator typically has to decide at virtual machine creation time on which physical machine the virtual machine should be deployed. Conventionally, placement of virtual machines is typically performed manually by an administrator. Although some systems are able to provide some indication to the administrator that migrating a virtual machine from one computer to another computer would be desirable, the actual selection of which computer a virtual machine should be migrated to is performed manually by the human administrator. Such manual placement of virtual machines by a human administrator is typically a time-consuming process and often does not lead to optimal or even better placement of virtual machines.

SUMMARY

In general, according to some embodiments, a mechanism or technique is provided to allow migration of virtual machines among physical machines in local groups. A physical machine in a first group attempts to find a layout to migrate virtual machine(s) in the first group. If a layout cannot be identified in the first group, a layout in a second group is identified to allow the virtual machine(s) in the first group to migrate to the second group.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

Figure 1:
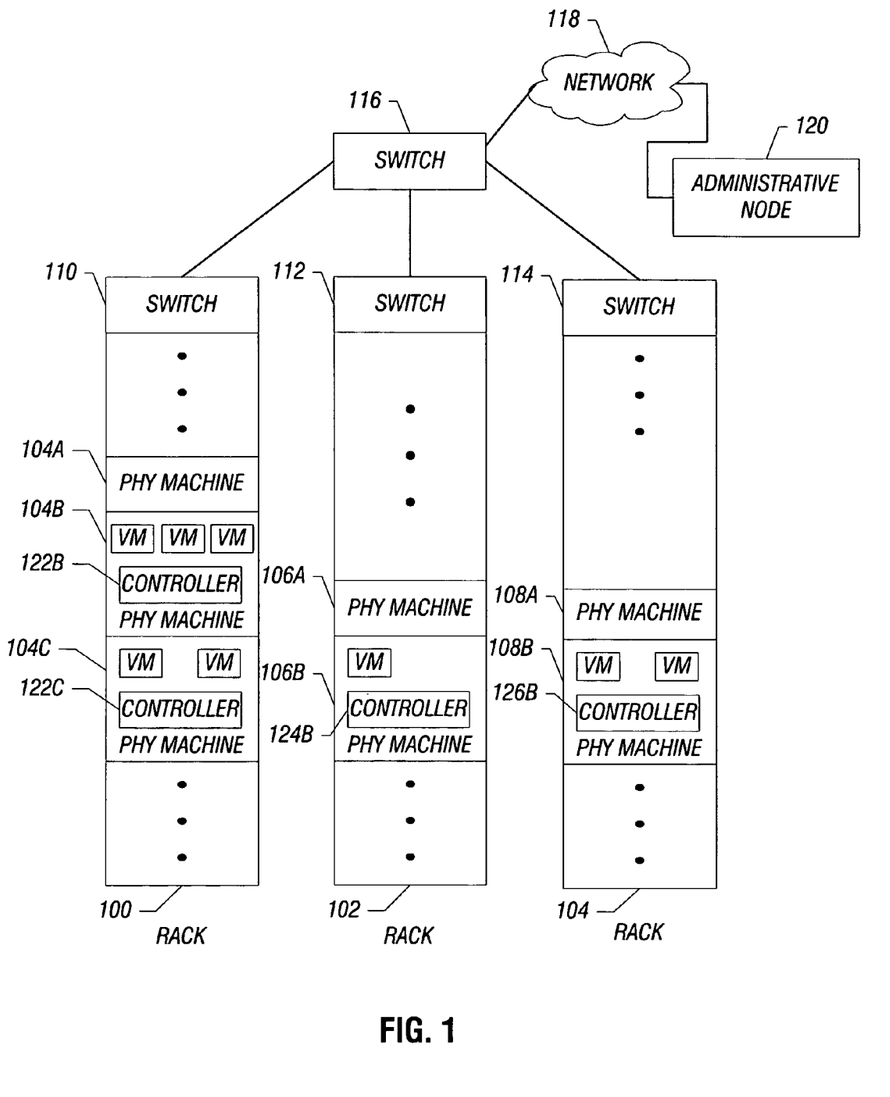
FIG. 1 is a block diagram of an example system including racks containing physical machines that include virtual machines, in accordance with an embodiment.

FIG. 1 illustrates a system that includes multiple racks 100, 102, 104, where each of the racks includes a number of physical machines (PMs). For example, the rack 100 includes physical machines 104A, 104B, and 104C; the rack 102 includes physical machines 106A, 106B; and the rack 104 contains physical machines 108A, 108B. In other arrangements, the physical machines are not included in racks, but rather, can be stand-alone nodes on a network. Although reference is made to "network" in the discussion, it is noted that some embodiments can be used with other types of interconnects. The system depicted in FIG. 1 can be any one of a data center, an application server farm, a storage server farm (or storage area network), a web server farm, a switch or router farm, and so forth. Although just three racks are depicted in FIG. 1, it is noted that other implementations of the system can include a larger or smaller number of racks.

Examples of physical machines include computers (e.g., application servers, storage servers, web servers, etc.), communications modules (e.g., switches, routers, etc.), and other types of machines. "Physical machine" indicates that the machine is an actual machine made up of software and hardware.

The example implementation of FIG. 1 also shows that each rack 100, 102, 104 has a respective switch 110, 112, 114, which are in turn connected to a switch 116 to enable communication among physical machines in different racks. The switches 110, 112, 114, 116 can include Ethernet switches, Internet Protocol (IP) routers, or any other type of switching or routing node for enabling communication among different physical machines in a network. The switch 116 is connected over a network 118 to an administrative node 120 according to an embodiment. Note that the switches 110, 112, 114, and 116 can be considered as being part of the network 118, where the network can include a local area network (LAN), a wide area network (WAN), the Internet, or any other type of communications link(s). Although not depicted in FIG. 1, the physical machines within each rack are also connected over an interconnect to each other.

In some implementations, the physical machines within a rack can be considered as being part of a subnet (or a sub-network), which is part of a larger network. A subnet is identified by the subnet part of an address (e.g., an IP address) used in communications among the physical machines of the system depicted in FIG. 1. A benefit of a subnet is that more efficient communication (e.g., broadcast communication) can occur within the subnet. In other implementations, the concept of subnets is not employed.

As depicted in FIG. 1, each physical machine contains one or more virtual machines (VMs). Although present, virtual machines in physical machine 104A, 106A, 108A are not depicted in FIG. 1. Also, note that the numbers of virtual machines in each physical machine shown in FIG. 1 are provided for purposes of example, as different implementations can employ different numbers (one or more) of virtual machines in the corresponding physical machines.

A virtual machine refers to some partition or segment (made up of software and/or hardware) of the physical machine that is provided to virtualize or emulate a physical machine. From the perspective of a user, a virtual machine looks just like a physical machine.

Each of the physical machines depicted in FIG. 1 also includes a corresponding controller, with controllers 122B, 122C, 124B, 126B shown in FIG. 1. The controllers of physical machines 104A, 106A, and 108A are not depicted in FIG. 1. The controllers are used for monitoring loading or some other characteristic of respective physical machines to determine whether a predefined policy is violated. If such policy is violated, one or more of the controllers will initiate certain actions to allow migration of one or more virtual machines between or among physical machines. The predefined policy can specify a target quality-of-service (QoS), loading criteria (which specify target loading levels on physical resources or machines), cooling criteria (which specify temperatures in physical machines that should not be exceeded), power criteria (which specify reduction of power consumption where possible), and other criteria.

Each controller within a physical machine is able to receive or retrieve state information (referred to as "PM state information") associated with one or more other physical machines such that the controller is able to determine how any migration of virtual machines should occur. Migrating a virtual machine refers to moving the state of the virtual machine (referred to as "VM state") from one physical machine to another physical machine. The VM state includes content of registers of various hardware devices (e.g., CPUs, I/O devices, and so forth). Data in memory associated with the migrated virtual machine can also be transferred gradually (e.g., lazily) to the destination physical machine to which the virtual machine is migrated.

In some embodiments, each physical machine is part of a group (referred to as a "buddy group") such that any physical machine within the buddy group is aware of PM state information of other physical machines in the buddy group. PM state information of a physical machine includes information relating to virtual machines, loading information, QoS information, temperature information, power consumption information, and information relating to any other characteristic that affects virtual machine performance within a physical machine.

The controllers within respective physical machines also maintain corresponding buddy lists, where each buddy list contains identifiers of physical machines within a corresponding buddy group. Each given controller uses its buddy list to identify other physical machines within the buddy group of the given controller. The buddy lists of respective controllers are created or updated based on interaction between the controllers and the administrative node 120, where a user or administrator can input information specifying criteria for how buddy groups are to be built. In most implementations, each controller has its own unique buddy group. Each controller has local PM state information, which is PM state information of other physical machines in the corresponding local group. Note, however, that if a system is small enough, then there may be just one buddy group such that each controller in the system will have the same buddy group.

The multiple controllers in the physical machines effectively provide a mechanism in the system of FIG. 1 to allow distributed control of migration of virtual machines among physical machines to satisfy some policy of the system. Within each buddy group, optimal (or alternatively, better) placement of virtual machines can be achieved with respect to the policy. In a first approach, migration of virtual machines is performed in response to detecting that any physical machine is violating a policy. In this approach, violating a policy refers to a condition in the physical machine violating some criterion of the policy (e.g., loading too high, QoS not being met, temperature or power consumption too high, etc.). In this first approach, the virtual machine placement selected is any placement where virtual machine(s) is (are) moved off the physical machine that is violating policy. The selected placement is a better placement than the original placement in that the selected placement allows the affected physical machine to meet policy.

In a second approach, rather than merely focusing on removing a condition that violates policy on a particular physical machine, the mechanism according to some embodiments attempts to select an optimal (or alternatively, better) placement of virtual machines that considers placement in all physical machines within a buddy group. The selection of a new placement can be performed periodically or in response to a triggering event (such as a physical machine entering a condition that violates policy).

In addition, if the policy cannot be attained within a buddy group, the mechanism according to some embodiments allows migration of virtual machines to a physical machine outside the buddy group. In other words, if satisfaction of the policy cannot be achieved within a particular buddy group, the mechanism according to some embodiments provides a technique to migrate a virtual machine of a controller in a first buddy group to a physical machine that is outside the first buddy group.

To allow for such migration, each unique buddy group overlaps with some other buddy groups (overlapping buddy groups share one or more physical machines). Overlapping buddy groups avoids the situation where the buddy groups of a system are disjoint buddy groups that are unable to help each other. By overlapping buddy groups, one buddy group can help another buddy group by enabling the migration of a virtual machine in a first physical machine within one buddy group to another physical machine in another buddy group.

A benefit according to some embodiments is that global knowledge of the entire system does not have to be maintained. In large systems, maintenance of global knowledge regarding all virtual machines and physical machines can be relatively expensive. Since each controller maintains state information of physical machines within a buddy group, the amount of state information that has to be considered by the controller is relatively small (when compared to global state information regarding all physical machines within the system). Also, by focusing on local placement, the mechanism according to some embodiments does not have to find a global optimal placement, which can take a relatively long time to find, especially for a large system. The term "optimal placement" can include either an exact optimal placement or approximate optimal placement.

A further benefit of the mechanism according to some embodiments is that the mechanism is relatively scalable because the mechanism keeps PM state information on a few physical machines rather than the entire system. Also, by decentralizing the migration control, the identifications of better placements of virtual machines in different buddy groups can be concurrently performed.

Figure 2:
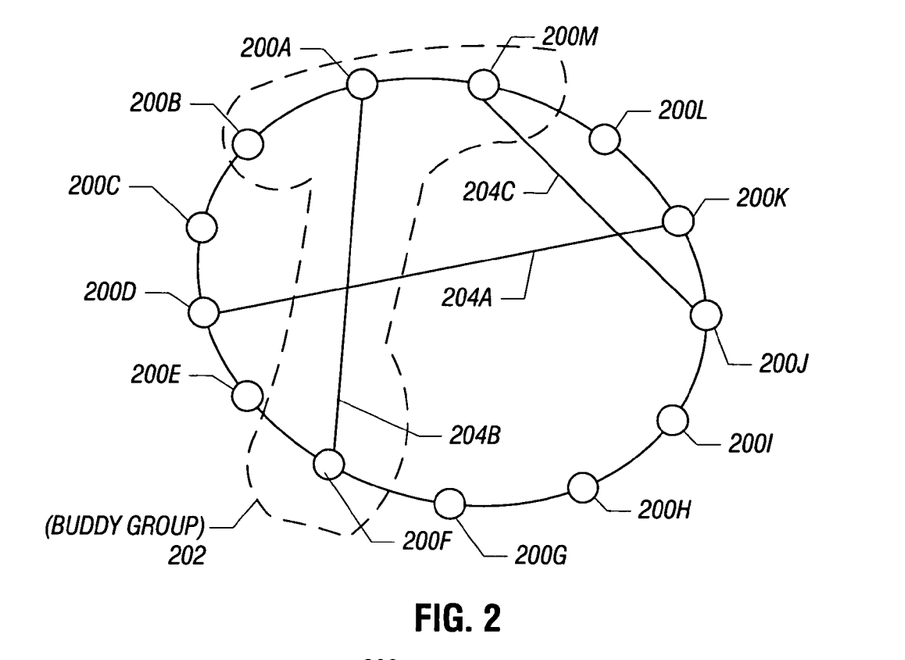
FIG. 2 illustrates knowledge relationships between physical machines to allow the definition of groups of physical machines, in accordance with an embodiment.

FIG. 2 shows an example arrangement of physical machines (represented by circles) 200A-200M (which are assumed to be all the physical machines within a system according to one example). Note that in other examples, a larger or smaller number of physical machines can be present in the system. Each of the arcs connecting pairs of physical machines to form a loop as depicted in FIG. 2 represent a knowledge connection (or friendship connection) between controllers of the corresponding physical machines. Thus, in the example of FIG. 2, the arc connecting physical machines 200A, 200B indicate that a knowledge connection exists between the controllers of physical machines 200A, 200B. A "knowledge connection" or "friendship connection" (used interchangeably) indicates that the physical machines connected by the knowledge connection or friendship connection are directly aware of each other's state information. The state information is used by each controller to determine a better placement (or optimal placement) of virtual machines within a buddy group.

In addition to the arcs representing knowledge connections between pairs of physical machines in FIG. 2, additional links 204A, 204B, 204C are provided between several pairs of physical machines. These links 204A, 204B, and 204C are provided to reduce "distances" between physical machines that are relatively "far away" from each other in the loop of FIG. 2. The concept of "distance" is an abstract concept to indicate the number of hops (where each hop represents a physical machine) in a chain of knowledge connections. Thus, in FIG. 2, physical machines 200D and 200E are within one hop of each other, as are physical machines 200D and 200C. Due to the presence of link 204A, physical machine 200D is also within one hop of physical machine 200K (even though there are many hops between physical machines 200D and 200K in the loop). The links 204A, 204B, and 204C can be added at random (based on random selection by the administrative node 120 in FIG. 1, for example). Alternatively, the links 204A, 204B, 204C can be predefined based on some analysis of the arrangement of all the physical machines within the system.

Due to the presence of links 204A, 204B, 204C, any physical machine is at most four hops or less away from any other physical machine in the example arrangement of FIG. 2. For example, physical machine 200B is four hops away from physical machine 200K. However, because of the presence of link 204A, physical machine 200C is two hops away from physical machine 200K (rather than five hops away if the link 204A was not present).

FIG. 2 also shows a buddy group 202 defined from the perspective of physical machine 200A. From the perspective of a particular physical machine, a buddy group can be defined as including any physical machines that are within one hop of the particular physical machine. Thus, any physical machine within one hop of physical machine 200A is considered to be part of the buddy group 202 of physical machine 200A. Note that the physical machines within the dashed profile 202 are each within one hop of physical machine 200A. Physical machine 200A contains state information of all physical machines within its buddy group 202.

The buddy group for physical machine 200M is different from the buddy group for physical machine 200A, according to some embodiments. Thus, multiple distinct buddy groups are defined that contain distinct subsets of the physical machines of the system, where at least some of the buddy groups overlap (share one or more physical machines). A subset of the physical machines refers to a collection of less than all of the physical machines in the system.

In other embodiments, other techniques of defining buddy groups can be employed.

The exchange of PM state information among physical machines in a buddy group can be performed using either a pull or push mechanism. With a pull mechanism, a controller in a physical machine can send a request(s) to other physical machines in the buddy group to retrieve PM state information.

The request(s) can be sent periodically or in response to an event. With a push mechanism, a controller can send PM state information maintained by the controller in response to any change in the state information or on a periodic basis.

Figure 3:
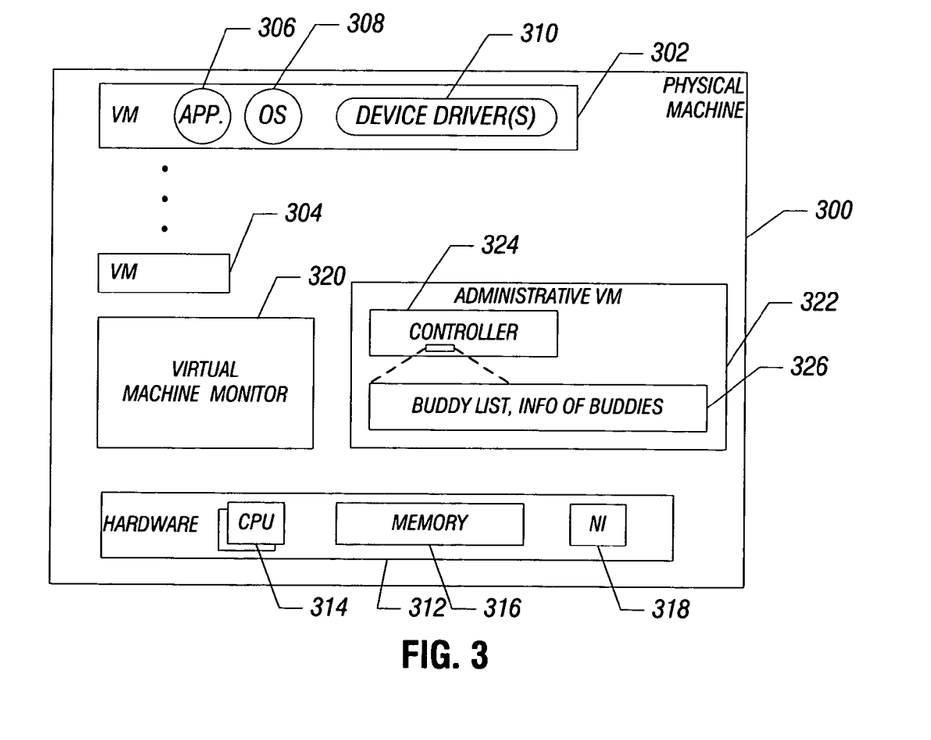
FIG. 3 is a block diagram of components of a physical machine, in accordance with an embodiment.

FIG. 3 shows an example arrangement of components within a physical machine 300, which can be any of the physical machines depicted in FIGS. 1 and 2. The physical machine 300 includes virtual machines 302, 304, where each physical machine includes a software application (or multiple software applications), an operating system, and device drivers (which are typically part of the operating system). For example, in virtual machine 302, a software application 306, operating system 308, and device driver(s) 310 are depicted. It is noted that the operating systems that are part of corresponding virtual machines within the physical machine 300 can be different types of operating systems or different versions of an operating system. This allows software applications designed for different operating systems to execute on the same physical machine.

The virtual machines within a physical machine are designed to share the physical resources of the physical machine. In the physical machine 300, these physical resources include hardware 312, which hardware 312 includes one or more central processing units (CPUs) 314, memory (volatile memory and/or persistent storage, such as disk-based storage) 316, a network interface 318 (for communication over a network), and other resources (such as a storage area network interface, not shown).

The physical machine 300 also includes a virtual machine monitor (VMM) 320, also called a hypervisor, which manages the sharing (by virtual machines 302, 304) of the physical resources, including the hardware 312 of the physical machine 300. The VMM 320 virtualizes the physical resources, including the hardware 312, of the physical machine 300. Also, the VMM 320 intercepts requests for resources from operating systems in respective virtual machines so that proper allocation of the physical resources of the physical machine 300 can be performed. For example, the VMM 320 manages memory access, input/output (I/O) device access, and CPU scheduling for the virtual machines. Effectively, the VMM 320 provides an interface between the operating system of each virtual machine and the underlying hardware 312 of the physical machine 300. The interface provided by the VMM 320 to an operating system of a virtual machine is designed to emulate the interface provided by the actual hardware of the physical machine 300.

The physical machine 300 also includes an administrative virtual machine 322, which performs administrative tasks with respect to the physical machine 300. A controller 324 (corresponding to the controllers discussed above) is provided as a software application within the administrative virtual machine 322 in the embodiment of FIG. 3. In a different implementation, the controller 324 can be provided as an application outside the administrative virtual machine 322. The controller 324 maintains certain information 326, including a buddy list and state information of the physical machines within the buddy list.

Figures 4, 5:
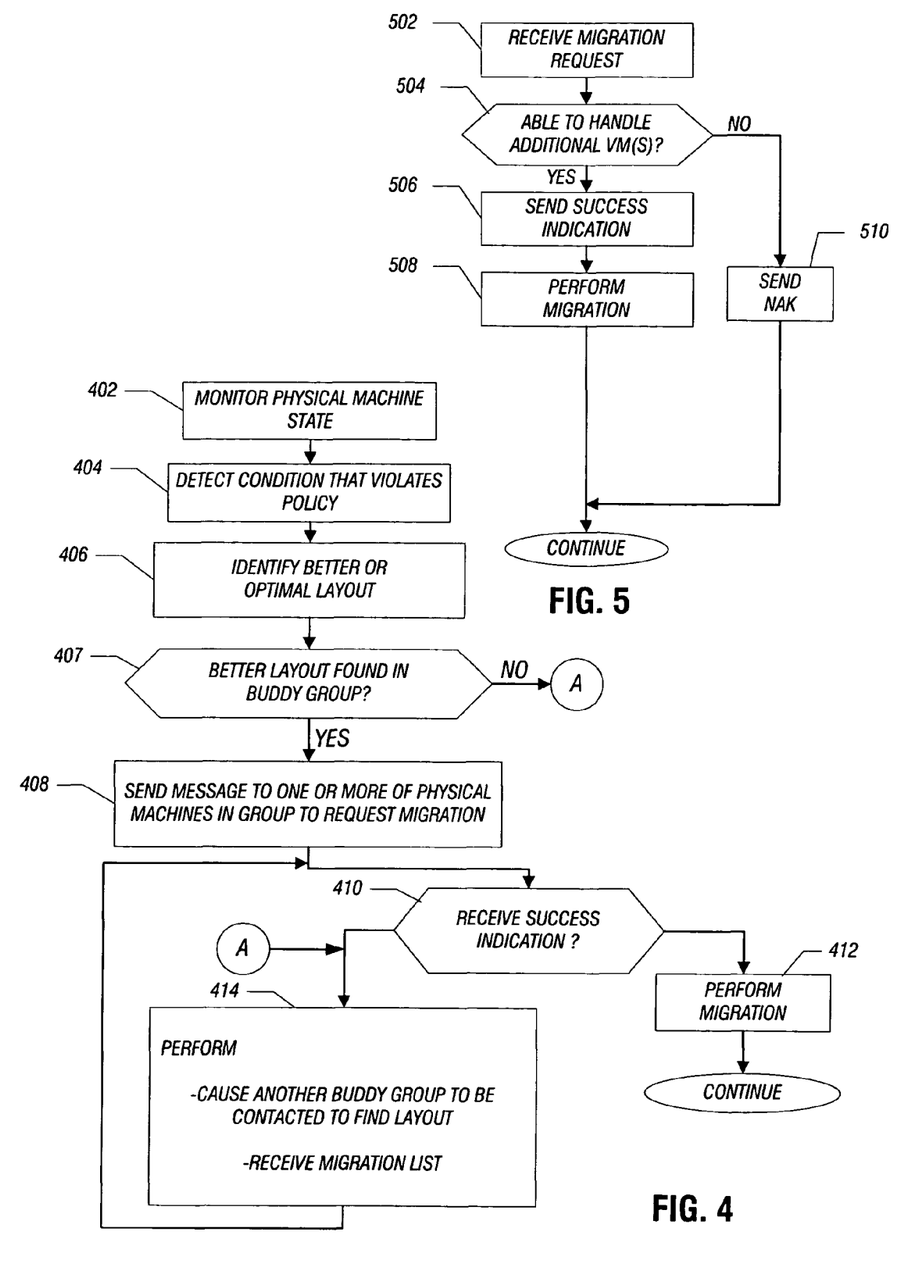
FIG. 4 is a flow diagram of a process of determining whether migration of virtual machines from a physical machine should be performed.
FIG. 5 is a flow diagram of a process performed in response to receiving a request for migration of virtual machines from another physical machine.

FIG. 4 shows tasks performed by the controller 324 within a particular physical machine 300. The controller 324 monitors (at 402) the physical machine state, including whether QoS specifications of virtual machines are being met; loading of resources such as the CPUs 314, memory 316, network interface 318, and other resources; overall loading of the physical machine; a temperature of the physical machine; power consumption within the physical machine; and others.

The controller 324 detects (at 404) a condition that violates a predefined policy. A condition that violates the predefined policy means that there is a condition that violates at least one of the criteria specified in the policy. For example, loading on CPUs 314 may exceed a threshold, overall loading of the physical machine can exceed a threshold, temperature of the physical machine may be greater than a threshold, power consumption exceeds a threshold, QoS of any virtual machine is not met, and so forth.

Alternatively, instead of monitoring the state of just the physical machine in which the controller 324 is located, the controller 324 can analyze (at 402) PM state information of all physical machines within its buddy group for the purpose of detecting whether a better placement of virtual machines can be achieved. As noted above, the controller 324 maintains PM state information of all physical machines within its buddy group. In this alternative scenario, detecting a condition that violates policy means detecting that the placement of virtual machines on the physical machines within the buddy group is less than optimal (or otherwise could be improved by migrating virtual machines).

Detecting whether better placement of virtual machines on physical machines is achievable can be performed in a brute-force manner according to one example implementation. The brute-force approach is feasible since there are a relatively small number of virtual machines within the physical machines of the buddy group. The brute force approach considers all possible combinations of placements of virtual machines on physical machines in a buddy group in finding a better (or optimal) placement. In alternative implementations, an algorithm, such as a stochastic algorithm, can be applied to determine (or estimate) whether better placements are possible. Examples of stochastic algorithms include a simulated annealing algorithm or a genetic algorithm.

Generally, simulated annealing considers a current set (that represents some random placement of virtual machines on physical machines in the buddy group) and iteratively adjusts the current set until a better set can be identified. The simulated annealing algorithm attempts to replace a current solution with a random "nearby" solution. A new set that is more optimal than the current set is used as the new current set and this process repeats until an approximated optimal solution within the buddy group is identified. Further details regarding a simulated annealing algorithm are provided in U.S. patent application Ser. No. 11/588,691, entitled "Selecting One of Plural Layouts of Virtual Machines on Physical Machines," filed Oct. 27, 2006. The simulated annealing algorithm described in the referenced application is for identifying a globally optimal placement of virtual machines on physical machines; however, the simulated annealing technique described in the referenced application can be readily applied to finding optimal placement of virtual machines within physical machines in a defined buddy group.

Instead of using a simulated annealing algorithm, a genetic algorithm can be used for identifying a better (or optimal) placement of virtual machines on physical machines within a buddy group. In the genetic algorithm approach, candidates corresponding to different virtual machine layouts within the buddy group are provided. These candidates are the potential solutions to the problem of finding a better (or optimal) virtual machine layout within the buddy group. The candidates are represented by genetic representations (in the form of genetic individuals that are made up of a set of genes). Each genetic individual represents a possible virtual machine placement solution within the buddy group. Each of the candidates represented by the genetic individuals is evaluated by the genetic algorithm to determine some goodness rating for the corresponding candidate.

Some subset of the genetic individuals can then be selected (such as the subset of parents with the best goodness ratings) as parents for performing a cross-over operation. In a cross-over operation, one genetic individual is combined with another genetic individual (by a cross-over function) to produce a child genetic individual. Each child genetic individual represents a different potential solution of a virtual machine layout. The goodness ratings for the children genetic individuals are then determined, with these children genetic individuals selected for further cross-over operation. The genetic algorithm proceeds over several different generations until some better solution is identified.

Note that the above discusses two alternative approaches to the issue of determining whether virtual machines should be migrated. The first approach is based on identifying whether the state of a particular physical machine violates policy, and remedying the violation condition in the particular physical machine.

The second approach involves the controller 324 identifying an optimal placement based on PM state information associated with all physical machines within the buddy group. The second approach is a more aggressive approach since it attempts to find a better (or optimal) placement that considers state information of all physical machines within a particular buddy group.

The controller 324 thus identifies (at 406) a better (or optimal) virtual machine layout based on the PM state information of the physical machines. In the first approach, identifying a better layout can be as simple as identifying some physical machine with excess capacity to which a virtual machine can be migrated to remove a policy violation condition. In the second approach, identifying a better (or optimal) layout can use one of the brute force, simulated annealing, and genetic algorithm approaches discussed above.

The controller 324 determines (at 407) whether a better placement in the buddy group has been found. If not, the controller 324 asks another controller in its buddy group for help in finding a physical machine in the different buddy group associated with the other controller to accommodate the virtual machine(s). This is discussed in connection with task 414 further below. On the other hand, if the controller 324 is able to find a better placement in the buddy group of the controller 324, the controller 324 sends (at 408) a message to one or more other physical machines (based on the identified placement) in the buddy group to request migration of virtual machine(s). In one implementation, the sending at 408 can be a broadcast of the migration request to multiple physical machines. As noted above, broadcast messages can be sent within a subnet. In other implementations, the sending at 408 can include multiple messages sent to multiple physical machines in the buddy group.

Since the controller 324 has considered the PM state information of physical machines in the buddy group in identifying the better placement, the migration of virtual machine(s) should be able to proceed successfully. However, in some implementations, the process considers the possibility that a physical machine receiving the migration request message may not be able to accommodate the migration. In this case, the controller 324 determines (at 410) whether the controller 324 has received a success indication in response to the migration request sent at 408. If a success indication is received, then the migration can be performed (at 412). However, if a success indication is not received, indicating that the physical machine(s) to which the migration request is sent is (are) unable to accept migration of virtual machines, then the controller 324 performs the task (at 414).

Note also that the task at 414 is performed if, at 407, the controller 324 is unable to find a better placement within the buddy group. In other words, if the controller 324 is unable to find any placement of virtual machines within the buddy group that can meet policy goals, then the controller 324 proceeds directly to task 414 to request that another buddy group be contacted to service a migration request.

For example, if PM A (physical machine A) is unable to find a better placement in buddy group A (the buddy group associated with PM A), then PM A contacts another PM (e.g., PM B) in buddy group A for help. In response to this contact, PM B attempts to find a layout of virtual machines in buddy group B (the buddy group for PM B that is different from buddy group A) that can accommodate the virtual machine(s) of PM A. If PM B is unable to find such a layout, then PM B will contact another PM (e.g., PM E) in buddy group B to request help from PM E in finding a placement in buddy group E that can accommodate the virtual machine(s) of PM A. Note that PM E can be a physical machine that is not in buddy group A and whose state information PM A knows nothing about. This process can continue on for m hops (where m is predefined). Ultimately, PM x can be identified to which migration of virtual machine(s) of PM A is to be performed, even though PM x is a physical machine which PM A knows nothing about. However, the knowledge connections of FIG. 2 allow for communication between PM A and PM x through the intervening hops.

Once a layout in a remote buddy group (not a buddy group of PM A) is found, then a migration list can be created and propagated back to PM A (which migration list is received by the controller 324 of PM A). The migration list indicates which physical machines are involved in the migration of virtual machine(s) of PM A to a remote buddy group (e.g., PM A sending a migration request to PM B, which sends a migration request to PM E, and so forth). Based on the migration list, migration of virtual machine(s) of PM A can be performed.

FIG. 5 shows tasks performed by the controller 324 in response to a migration request received (at 502) from another controller (requesting controller) in the buddy group. The controller 324 determines (at 504) whether the controller 324 is able to accommodate the additional virtual machines indicated by the migration request. If so, the controller 324 sends (at 506) a success indication back to the requesting controller, and migration can be performed (at 508).

If the controller 324 determines (at 504) that it is unable to accommodate the additional virtual machine(s) specified by the migration request, then the controller 324 sends (at 510) a negative acknowledge (NAK) to indicate failure to the requesting controller. If the additional virtual machine(s) would cause a policy violation in the physical machine in which the controller 324 resides, then the controller 324 would indicate that the controller 324 is unable to accommodate the additional virtual machine(s).

Instructions of software described above (including controller 324 of FIG. 3) are loaded for execution on a processor (such as one or more CPUs 314 in FIG. 1). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a system having plural physical machines, comprising:
defining plural groups including corresponding subsets of the plural physical machines, wherein defining the plural groups comprises:
storing, by a first controller, state information of the respective subset of the physical machines in a first group of the plural groups;
storing, by a second controller, state information of the respective subset of the physical machines in a second group of the plural groups, wherein the state information stored by the first controller is different from the state information stored by the second controller;
detecting that a first placement of virtual machines on the physical machines in the first group violates a policy;
determining that one or more of the virtual machines have to be migrated outside the first group to satisfy the policy;
identifying, by the first controller in the first group, a second placement of virtual machines in which the one or more virtual machines are to be migrated from the first group to the second group; and
performing migration of the one or more virtual machines between or among the physical machines in the first and second groups according to the identified second placement.

2. The method of claim 1, further comprising:
identifying, by the second controller in the second group, a third placement of virtual machines on the physical machines in the second group; and
performing migration of at least one of the virtual machines in the second group between or among the physical machines in the second group according to the third placement.

3. The method of claim 1, wherein storing the state information of the respective subset of physical machines in the first group comprises storing a list of identifiers of the respective subset of physical machines in the first group, and wherein storing the state information of the respective subset of physical machines in the second group comprises storing a list of identifiers of the respective subset of physical machines in the second group.

4. The method of claim 1, further comprising:
the first controller receiving an indication of one or more physical machines outside the first group to which the determined one or more virtual machines are to be migrated.

5. The method of claim 4, wherein receiving the indication by the first controller comprises receiving a migration list.

6. The method of claim 1, wherein detecting violation of the policy comprises detecting a particular physical machine in the first group has a state that violates at least one criterion specified by the policy.

7. The method of claim 6, wherein detecting the particular physical machine has the state that violates the at least one criterion comprises detecting the particular physical has a state that violates at least one criterion selected from the group consisting of a target quality-of-service (QoS), a loading criterion, a cooling criterion, and a power criterion.

8. The method of claim 1, wherein detecting violation of the policy comprises determining that the first placement can be improved with the second placement.

9. The method of claim 1, wherein the first group of physical machines is different from the second group of physical machines.

10. The method of claim 9, wherein the first group shares at least one physical machine with the second group.

11. The method of claim 1, wherein the first controller is in a first physical machine in the first group, and wherein the second controller is in a second physical machine in the second group.

12. The method of claim 1, wherein the state information of the physical machines in the first and second groups comprises information selected from the group consisting of:
quality-of-service information regarding the physical machines, power-consumption information of the physical machines, and temperature information of the physical machines.

13. The method of claim 1, wherein detecting violation of the policy is based on monitoring the state information of the physical machines in the first and second groups.

14. An article comprising a computer-readable storage medium containing instructions that when executed cause a processor to:
define plural groups including corresponding subsets of plural physical machines in a system, wherein the plural physical machines contain virtual machines, wherein defining the plural groups comprises:
storing, by a first controller, state information of the respective subset of the physical machines in a first group of the plural groups;
storing, by a second controller, state information of the respective subset of the physical machines in a second group of the plural groups, wherein the state information stored by the first controller is different from the state information stored by the second controller;
detect a condition that violates a predefined policy in the first group;
in response to detecting the condition, determine whether a first layout of virtual machines in the first group can be identified to address the condition that violates the predefined policy, wherein the identified first layout specifies migration of at least one virtual machine among physical machines in the first group; and
in response to determining that the first layout of virtual machines in the first group to address the condition cannot be identified, identifying a second layout that specifies migration of the at least one virtual machine from a physical machine in the first group to a physical machine in the second group.

15. The article of claim 14, wherein the instructions when executed cause the processor to further:
send a migration request from a first physical machine in the first group to a second physical machine in the first group to request migration of the at least one virtual machine according to the identified first layout; and
in response to a success indication that is responsive to the migration request, perform migration of the virtual machine from the second physical machine to the first physical machine.

16. The article of claim 14, wherein the instructions when executed cause the processor to further:
receive a migration list from the second group that indicates how migration of the at least one virtual machine is to be performed from the first group to the second group.

17. The article of claim 14, wherein identifying the first layout and the second layout is based on the state information.

18. The article of claim 14, wherein the state information of the physical machines in the first and second groups comprises information selected from the group consisting of:
quality-of-service information regarding the physical machines, power-consumption information of the physical machines, and temperature information of the physical machines.

19. A system comprising:
plural physical machines containing virtual machines, wherein at least a first group and a second, different group of the physical machines are defined, wherein a first one of the physical machines includes a first controller and is part of the first group, wherein a second one of the physical machines includes a second controller and is part of the second group,
the first controller to:
maintain state information of the physical machines in the first group; and
identify a first placement of the virtual machines in the physical machines in the first group based on the state information, and
the second controller to:
maintain state information of the physical machines in the second group, wherein the state information maintained by the first controller is different from the state information maintained by the second controller, and
wherein the first controller is configured to identify a second placement in response to determining that no physical machine in the first group is able to accommodate a particular virtual machine, the second placement to cause migration of the particular virtual machine on the first physical machine to another physical machine in the second group.

20. The system of claim 19, wherein the first controller is configured to cause migration of at least one of the virtual machines between or among physical machines in the first group according to the identified first placement.

* * * * *